United States Patent
Svejkovsky et al.

(10) Patent No.: US 9,630,786 B1
(45) Date of Patent: Apr. 25, 2017

(54) CONVEYOR METHOD AND SYSTEM FOR CONVEYING AND MANAGING A FOOD INVENTORY

(71) Applicants: P. Blake Svejkovsky, Coppell, TX (US); Kenneth C. Petri, Richardson, TX (US)

(72) Inventors: P. Blake Svejkovsky, Coppell, TX (US); Kenneth C. Petri, Richardson, TX (US)

(73) Assignee: Karen Sue Svejkovsky, Rockwall, TX (US), Trustee of the Paul A. Svejkovsky Family Trust ( * ) Notice: Subject to any disclaimer, the term of this patent is extended or adjusted under 35 U.S.C. 154(b) by 0 days.

(21) Appl. No.: 15/081,033

(22) Filed: Mar. 25, 2016

(51) Int. Cl.
*B65G 47/46* (2006.01)
*B65G 47/51* (2006.01)

(52) U.S. Cl.
CPC .. *B65G 47/5195* (2013.01); *B65G 2201/0202* (2013.01)

(58) Field of Classification Search
CPC .................................. B65G 47/46; B07C 9/00
USPC ....................... 198/360, 367.1, 442; 209/655
See application file for complete search history.

(56) References Cited

U.S. PATENT DOCUMENTS

| | | | | |
|---|---|---|---|---|
| 4,108,301 A * | 8/1978 | Trozzi | ..................... | B65G 47/72 198/633 |
| 5,788,052 A * | 8/1998 | Spatafora | ............. | B65G 47/766 198/367.1 |
| 5,887,699 A * | 3/1999 | Tharpe | ..................... | B07C 3/065 198/367 |
| 5,938,002 A * | 8/1999 | Molenaar | ........... | B65G 47/1471 198/445 |
| 6,935,586 B1 * | 8/2005 | Janssen | ............... | B02C 18/0084 100/102 |
| 7,946,429 B2 * | 5/2011 | Kennedy | ................ | B65G 47/52 198/456 |
| 8,080,758 B2 * | 12/2011 | Rosenbaum | ............ | B07C 3/008 209/584 |
| 8,408,380 B2 * | 4/2013 | Doane | .................. | B65G 47/506 198/460.1 |
| 8,640,855 B2 * | 2/2014 | Brobst | ................. | B65G 11/206 193/32 |
| 8,776,991 B2 * | 7/2014 | Alexander | ......... | B65G 47/5122 198/442 |

(Continued)

*Primary Examiner* — Douglas Hess
(74) *Attorney, Agent, or Firm* — Streets & Steele; Patrick K. Steele; Jeffrey L. Streets

(57) ABSTRACT

A distribution conveyor having a proximal and a distal ends, a first and a second sides and one or more adjustable side-discharging flow control valves between the proximal and distal ends, and a recirculation conveyor having a proximal end, proximal to the distal end of the distribution conveyor, and a distal end proximal a redeposit section of the distribution conveyor, wherein the valves can discharge a portion of a source stream of product from the distribution conveyor to a receiving structure underneath each valve, wherein the distal end of the recirculation conveyor is positioned to recirculate a tail stream from the distal end of the distribution conveyor to a redeposit section of the recirculating conveyor, and wherein the distal end of the recirculation conveyor is positioned to return the tail stream to the distribution conveyor laterally offset to a centerline of the distribution conveyor for preferential discharge in the valve(s).

18 Claims, 8 Drawing Sheets

(56) References Cited

U.S. PATENT DOCUMENTS 8,794,423 B2 * 8/2014 Sasstamo .................. B07C 5/14
198/457.02

* cited by examiner

CONVEYOR METHOD AND SYSTEM FOR CONVEYING AND MANAGING A FOOD INVENTORY

BACKGROUND

Field of the Invention

The present invention relates to conveyor method and conveyor system for conveying and managing an inventory of food in a food preparation and bagging facility. The conveyor method and conveyor system is for moving a stream of product consisting of a large plurality of individual perishable food portions that spoil or stale with prolonged exposure to the facility environment.

Background of the Related Art

Product conveyor systems for use in the processing, preparation and packaging of food products and other products may include adjustable side-discharging flow control valves that can be selectively adjusted to separate an incoming stream of, for example, individual perishable food portions into two separated streams that are each directed to a separate area of the same facility. For example, a source stream of product consisting of a large plurality of individual food portions may be prepared and delivered, using a distribution conveyor, to an area of a processing facility in which a first portion of the source stream of the perishable food product is flavored with a first flavor of seasoning material while another, second portion of the source stream that is separated from the first portion of the stream, is flavored with a second flavor of seasoning material. It will be understood that a product such as, for example, potato chips, may be flavored in this manner in order to suit the diverse tastes of consumers. In order to provide a first portion of the source stream of the perishable food portions to a first seasoning station for application of the first seasoning material and a second portion of the source stream of the perishable food portions to a second seasoning station for application of the second seasoning material, the source stream of unflavored or "raw" perishable food portions must be split or separated into two (or more) smaller streams, each of which is a portion of the original source stream of the perishable food product. It will be understood that this is an efficient process that enables the demand for two (or more) differently seasoned products to be satisfied using a single source of the raw product to feed two (or more) seasoning stations that, in turn, feed weighing and packaging machines where bags of the product are weighed and sealed to prevent the food product from becoming stale due to prolonged exposure to the facility environment.

Adjustable flow control valves, variable flow control valves, proportional gates, and revolution gates are all terms that are used in referring to apparatuses that can be used to controllably separate a source stream into two or more portions. As applied to conveyor systems, these terms refer to apparatuses that enable the selective control of the portion of an incoming source stream of product that can be discharged from a distribution conveyor while retaining the remaining portion of the source stream on the distribution conveyor for movement to another valve or gate, or for movement to another station within the facility. These apparatuses, as they are used in connection with the separation and handling of perishable food products, will be referred to herein as adjustable flow control valves.

For example, a distribution conveyor can be used to move a source stream of perishable food product within a facility. A first adjustable flow control valve can be included within that distribution conveyor and used to discharge a controllable portion of an incoming source stream of the food product from the distribution conveyor and to a receiving conveyor for being conveyed to a first seasoning station in which a first seasoning material is applied, in a predetermined weight ratio, to the first portion of the source stream of the food product that is discharged from the distribution conveyor using the first adjustable flow control valve. That first portion of the source stream of the perishable food product that is seasoned with the first seasoning material at the first seasoning station may then be conveyed using a conveyor to a weighing and bagging machine in which the seasoned product is separated into discrete weight amounts of the seasoned product and sealed in bags for transport and sale to consumers.

The remaining portion of the source stream of the perishable food product that remains on the distribution conveyor and moves beyond the first adjustable flow control valve, i.e. the portion of the source stream of the perishable food product that enters the first adjustable flow control valve and that was not discharged from the distribution conveyor by the first adjustable flow control valve, will be moved by the distribution conveyor to one of: a final destination, a second adjustable flow control valve and a distal end of the distribution conveyor. It will be understood that the distribution conveyor may have a plurality of adjustable flow control valves, each of which is adjustable to vary the portion of the incoming stream of product that is discharged from that flow control valve. If the portion of the source stream of the perishable food product that remains on the distribution conveyor beyond the first adjustable flow control valve is moved along the distribution conveyor to a second adjustable flow control valve, then a second portion of the source stream of products can be discharged from the distribution conveyor by the second adjustable flow control valve, and the portion of the source stream of the perishable food product that remains on the distribution conveyor and that moves beyond the second adjustable flow control valve, i.e. the portion of the stream of product entering the second adjustable flow control valve that was not discharged from the distribution conveyor by either of the first or the second of the adjustable flow control valves, will remain on the distribution conveyor and move to one of a final destination, a third adjustable flow control valve and a distal end of the distribution conveyor. This pattern continues until: 1) all of the remaining stream of product on the distribution conveyor is discharged from the distribution conveyor by the aggregated adjustable flow control valves, or 2) there remains an undischarged portion of the original source stream, referred to herein as a "tail stream," of the perishable food product at the distal end or terminus of the distribution conveyor. The tail stream is the undischarged portion of the original source stream that has passed through the one or more adjustable flow control valves of the distribution conveyor.

In some conventional facilities that flavor and package perishable foods, the tail stream is discarded, resulting in an unwanted waste of food product and an unwanted loss of potential revenue that would have otherwise been received for the sale of the discarded product. In other conventional facilities that flavor and package perishable foods, the tail stream is recirculated and mixed with the incoming "fresh" source stream to prevent waste. However, with food products that perish or stale with prolonged exposure to the facility environment prior to being packaged and sealed, the recirculation of the tail stream and the mixing of the tail stream with the "fresh" incoming source stream is not an acceptable practice because at least some of the individual food portions that make up the source stream may be recirculated two or more times. These excessively recirculated individual food portions may become very stale and unpleasant to consume due to prolonged exposure to the facility environment. Even a few of these stale food portions being mixed in with fresh food portions in a package of the food product can lead to consumer dissatisfaction.

What is needed is a conveyor method and a conveyor system that can be used to prevent prolonged exposure of a tail stream of individual food portions while, at the same time, preventing unwanted discarding and waste of the tail stream. What is needed is a conveyor method and a conveyor system that can effectively limit the amount of additional exposure that may occur as a result of recirculation and use of the tail stream from a distribution conveyor.

BRIEF SUMMARY

Embodiments of the conveyor method and conveyor system of the present invention may be used to maintain the freshness and quality of a prepared food product prepared, processed, weighed and packaged within a facility and moved between stations using conveyors. More specifically, embodiments of the method and system of the present invention enable the recirculation of a tail stream of a food product in a manner that minimizes staleness due to exposure of the tail stream to the facility environment and that maximizes the overall freshness and quality of the packaged food product.

The present invention relates to an inventory management system for use with conveyed foods. More specifically, the present invention relates to an inventory management system for recirculating a tail stream of a perishable food product and introducing the tail stream back into a source stream of the perishable food product while limiting the duration of exposure of the re-introduced tail stream to a facility environment that would otherwise result in staleness and a loss of consumer satisfaction.

One embodiment of the present invention provides a method of managing an inventory of a perishable food product comprising the steps of providing a distribution conveyor having a proximal end, a distal end, one or more adjustable side-discharging flow control valves therebetween, a first side, a second side, and a centerline therebetween, the distribution conveyor being managed to receive and move a source stream of the perishable food product and to distribute portions of the source stream to one or more receiving structures and to the distal end of the distribution conveyor. A receiving structure may, in one embodiment, be a receiving conveyor that transports a received portion of the source stream to a seasoning station and/or to a weighing and bagging (packaging) machine.

A receiving structure, such as a receiving conveyor, may receive a portion of the source stream moved on the distribution conveyor into an adjustable side-discharging flow control valve that controllably discharges a controllable portion of the source stream of the food product from a side of the distribution conveyor to the receiving structure. An adjustable side-discharging flow control valve is a component of the distribution conveyor that can receive an incoming stream of the perishable food product on the distribution conveyor and controllably discharge an adjustable portion of the source stream of the food product from the distribution conveyor while moving the remaining portion of the source stream of the food product through the flow control valve for being conveyed on the distribution conveyor to one of another flow control valve that discharges to a receiving structure and the distal end of the distribution conveyor.

An adjustable flow control valve is a component of the distribution conveyor that can receive an incoming stream of product on the distribution conveyor and discharge an adjustable portion of the stream of product from a side of the distribution conveyor while moving the remaining portion of the stream of product through the adjustable flow control valve to remain on the distribution conveyor. A side-discharging adjustable flow control valve is a component of the distribution conveyor that can receive an incoming stream of product on the distribution conveyor and discharge an adjustable portion of the source stream of product primarily from one of the first side and the second side of the distribution conveyor while moving the remaining and undischarged portion of the source stream of the food product through the side-discharging adjustable flow control valve to remain on the distribution conveyor. It will be understood that the distribution conveyor may include a trough to hold and to contain the source stream of the food product as it moves along the distribution conveyor. A side-discharging adjustable flow control valve can not only discharge an adjustable portion of the source stream of product to a receiving structure, but it also preferentially discharges a portion of the source stream of the food product that is laterally offset from a centerline of the distribution conveyor towards one of a first side and a second side of the distribution conveyor. This additional capability of the adjustable side-discharging flow control valve is important because it enables a tail stream of recirculated food product to be combined with the source stream in the distribution conveyor in a manner that ensures that the recirculated tail stream will be discharged and conveyed to a subsequent processing step such as, for example, a seasoning station, and/or to a weighing and bagging machine without being twice recirculated. It will be understood that limiting the tail stream to a single recirculation step through the use of the conveyor method and conveyor system of the present invention maintains freshness and prevents staleness.

One embodiment of the conveyor method of the present invention includes the steps of providing a distribution conveyor having a proximal end, a distal end, a first side, a second side, a centerline between the first and second sides, and one or more adjustable side-discharging flow control valves, providing a recirculation conveyor having a proximal end, proximal to the distal end of the distribution conveyor, and a distal end, receiving a source stream of the perishable food product at the proximal end of the distribution conveyor, moving the source stream of the perishable food product along the distribution conveyor towards the distal end of the distribution conveyor and into the one or more adjustable side-discharging flow control valves, the one or more adjustable side-discharging flow control valves each being adapted for preferentially discharging an adjustable portion of the source stream of the perishable food product from one of the first side and the second side of the distribution conveyor, providing a receiving structure proximal to each of the one or more adjustable side-discharging flow control valves each to receive the discharged portions of the source stream of the food product from each of the one or more flow control valves for transport to one of a seasoning station, a weighing and packaging machine at which each of the discharged portions of the source stream can be one of seasoned and weighed and packaged in discrete amounts in sealed bags bearing a description of the food product and seasoning applied thereto, or some other station, conveying a remaining portion of the source stream of the food product further along the distribution conveyor and away from the one or more adjustable side-discharging flow control valves and to the distal end of the distribution conveyor as a tail stream, discharging the tail stream to the proximal end of the recirculation conveyor, conveying the tail stream, which is the remaining portion of the source stream that passed through the one or more adjustable side-discharging flow control valves, on the recirculation conveyor, discharging the tail stream from the recirculation conveyor and back onto the distribution conveyor within a redeposit section of the distribution conveyor that is intermediate the proximal end and the one or more adjustable side-discharging flow control valves of the distribution conveyor and laterally offset from the centerline of the distribution conveyor towards the one of the first side and the second side of the distribution conveyor from which discharge occurs at the flow control valve; wherein the tail stream is subsequently removed from the distribution conveyor a second time upon being selectively discharged from the conveyor through the one or more adjustable side-discharging flow control valves.

In one embodiment of the conveyor method and the conveyor system of the present invention, a distribution conveyor may include a first adjustable side-discharging flow control valve and a second adjustable side-discharging flow control valve, each of which include a rotatable sleeve having an aperture that is independently positionable between an elevated position, for preventing the discharge of any portion of the source stream, and a lowermost position at which the entire source stream is discharged to the receiving structure.

For example, but not by way of limitation, the first adjustable side-discharging flow control valve may be positioned to discharge a first portion of the source stream of product moving along the distribution conveyor from the first adjustable side-discharging flow control valve to a first receiving structure, which may be a receiving conveyor that moves the discharged portion of the source stream to a destination within the facility such as, for example, a weighing and bagging machine or a seasoning station, or both. Further down the distribution conveyor from the first adjustable side-discharging flow control valve there may be a second adjustable side-discharging flow control valve that receives, into its upstream end, the remaining portion of the stream of product that entered the first side-discharging flow control valve but was not discharged from that flow control valve. The second adjustable side-discharging flow control valve of the distribution conveyor can be positioned to discharge a second portion of the source stream of food product to a second receiving structure which, like the first receiving structure, may be a receiving conveyor that moves the discharged portion of the source stream to a destination within the facility such as, for example, a weighing and bagging machine or a seasoning station, or both.

The number of adjustable side-discharging flow control valves included within a distribution conveyor to selectively split or separate an incoming source stream of individual perishable food portions can be one, two or more, and that, depending on the positioning of the adjustable side-discharging flow control valves, a plurality of discharged stream portions can be discharged from the distribution conveyor to corresponding receiving structures that are part of a plurality of process lines. If the last adjustable side-discharging flow control valves in a series of adjustable side-discharging flow control valves of a distribution conveyor is positioned to discharge less than all of the source stream of individual food portions that enter the upstream end of the last adjustable side-discharging flow control valve, then there will be a remaining portion of the source stream of product that moves past the last active (e.g., partially-opened) adjustable side-discharging flow control valve. This leftover or undischarged portion of the source stream of individual food portions is referred to herein as a "tail stream" that must either be discarded or recirculated.

It is undesirable to discard the individual food portions of the tail stream due to the obvious loss of valuable stock and ingredients that went into making the individual food portions of the tail stream. Recirculating and using the tail stream is more economically efficient, but it presents a problem where the food product is of a nature that causes it to become stale or to lose freshness with prolonged exposure to the environment within the facility. Mixing an excessively exposed or stale tail stream of the food product back in with incoming source stream of food product may result in bags of product that contain a few stale food portions with a large number of fresh food portions, and consumer satisfaction will be lost.

Embodiments of the conveyor method and conveyor system of the present invention provide a solution to the problem of mixing a tail stream of the individual food portions that reach the distal end of the distribution conveyor, which has already been exposed to the facility environment for the time required for moving along the distribution conveyor to the distal end of the distribution conveyor, with a relatively fresh source stream of the food product. Embodiments of the conveyor method and conveyor system of the present invention provide a recirculation conveyor to receive and move the tail stream of food products from the distal end of the distribution conveyor to a redeposit section of the recirculation conveyor. The redeposit section of the distribution conveyor is a section of the distribution conveyor that is intermediate the proximal end of the distribution conveyor that receives the source stream and the one or more adjustable side-discharging flow control valves and laterally offset from a centerline of the distribution conveyor towards the first side. Returning the tail stream to the redeposit section of the distribution conveyor ensures that the tail stream will be preferentially discharged by the first active adjustable side-discharging flow control valve at which the tail stream arrives, thereby moving the tail stream to the next process destination, which may be one of a seasoning station and a weighing and bagging machine, to minimize the period of exposure of the tail stream to the facility environment. Combining the tail stream with the fresh source stream of incoming food product disposes the individual food portions that make up the tail stream along a first side wall of the distribution conveyor so that all, or at least a substantially majority, of recirculated food portions that make up the tail stream are preferentially positioned within the distribution conveyor for being discharged from the distribution conveyor at the first active adjustable side-discharging flow control valve that is immediately downstream from the redeposit section of the distribution conveyor. It should be noted that the side of the distribution conveyor from which the adjustable side-discharging flow control valve discharges must be on the same side as the laterally offset redeposit section of the distribution conveyor.

In one embodiment of the conveyor method and conveyor system of the present invention, a trough (the surface of the distribution conveyor that supports the food product) of the distribution conveyor may be semi-circular in shape. In another embodiment of the conveyor method and conveyor system of the present invention, the trough of the distribution conveyor may include a flat bottom and two or more side walls each of which intersect the flat bottom, on opposing sides, at an obtuse interior angle. For example, an inverted normal trapezoidal cross-section would be included among the flat bottom type of trough, as illustrated in FIG. 12.

It will be understood that there are a variety of different types of conveyors that can be used to implement the conveyor method and conveyor system of the present invention, or that are included within a system or apparatus of the present invention. In one embodiment of the conveyor method and conveyor system of the present invention, the distribution conveyor is one of a reciprocating conveyor and a declined vibratory conveyor. A reciprocating conveyor is a conveyor that is reciprocated by a differential impulse driver to move the food product supported on the conveyor along a smooth product support surface. The product support surface is axially moved, at a first rate of acceleration, through a predetermined distance, then axially returned, at a second rate of acceleration that is greater than the first rate of acceleration, to the original position. The first rate of acceleration is sufficiently slow so that the food product on the conveyor moves with the conveyor surface or substantially with the conveyor surface, and the second rate of acceleration is sufficiently fast so that the food product slides on the conveyor. The net result of each cycle is that the food product advances along the conveyor. The adjustable side-discharging flow control valves of the distribution conveyor are of a type that can be integrated into the distribution conveyor without affecting the capacity of the distribution conveyor to uniformly transfer differential impulse movement along the length of the distribution conveyor. A reciprocating conveyor is especially useful for moving a fragile product that is subject to breaking, shattering or crumbling as a result of interaction with seams or moving surfaces that are not smoothed to promote sliding.

A declined vibratory conveyor is a conveyor having a food support surface that vibrates to minimize static friction between the individual food portions that make up the stream of product so that, if the conveyor is slightly declined, the food product will advance in the direction in which the conveyor is declined.

The recirculation conveyor of the present invention may include a reciprocating conveyor or a belt conveyor, but a vibratory conveyor may require additional auxiliary equipment to elevate the stream of food product from a lower proximal end to a higher distal end. It will be understood that the distal end of the recirculation conveyor must be higher than the proximal end of the recirculation conveyor in order to elevate the tail stream so that it can be dropped as it is discharged from the recirculation conveyor to the distribution conveyor. A reciprocating conveyor is especially useful in this application because it can move a large plurality of individual food portions along an inclined recirculation conveyor surface. While the angle of inclination along which the tail stream of individual food portions may be moved is limited, and the maximum angle of inclination depends on factors such as, for example, the nature and texture of the individual food portions that make up the tail stream.

Different types of adjustable side-discharging flow control valves that can be used with a conveyor method and conveyor system of the present invention. One particular type of adjustable side-discharging flow control valve that can be used to implement an embodiment of the method and system of the present invention is an adjustable side-discharging flow control valve includes a rotatable sleeve having an aperture, as discussed and described above. Another adjustable side-discharging flow control valve that could be used to implement an embodiment of the method and system of the present invention is a flow control valve having a hole, opening or slot that is closable using a slidable gate or door mechanism or a pivotable gate or door mechanism. For example, but not by way of limitation, a slidable door may, when in the closed position, serve as a portion of the flat bottom of a conveyor trough that is laterally offset from a centerline of the conveyor. When the door slides to the open position, a portion of the floor will be open and a portion of the source stream of product that is laterally offset from the centerline will be discharged from the distribution conveyor to a receiving structure. As another example, and again not by way of limitation, a pivotable door may serve as a portion of an inclined side wall of a trough. When the door pivots to an open position, a portion of the side wall will be open and a portion of the source stream of product that is laterally offset from the centerline will be discharged from the distribution conveyor to a receiving structure. Any type of adjustable side-discharging flow control valve will, when opened, whether by slidable door, pivotable door or positionable aperture, discharge a portion of the stream of food product from the distribution conveyor to a receiving structure, and the discharged portion of the stream of food product will be from a portion of the stream of food product that is laterally offset from a centerline of the distribution conveyor.

Another adjustable side-discharging flow control valve that could be used to implement an embodiment of a conveyor method and conveyor system of the present invention is a flow control valve having a conveyor belt that is, in a limited area, supported by a movable support member that has a repositionable or removable portion. When the repositionable portion of the support member is in the supporting position, the conveyor belt is uniformly supported across its width. When the repositionable portion of the support member is moved to a discharge position, the conveyor belt is unsupported in a location that is laterally offset from the centerline of the conveyor belt. This discharge position of the support member enables the discharge of a portion of the source stream of individual food portions by lowering the support member away from the conveyor belt to cause the conveyor belt on which the source stream of product is moved and supported to lack support in a certain, affected localized area, and to cause the belt to sag into that unsupported void in the support surface. This sagging of the belt of the belt conveyor will cause a portion of the source stream that is laterally offset from the centerline of the distribution conveyor and moving on the belt to fall off to the side of the belt and be discharged from the conveyor.

While the equipment needed to implement or provide an embodiment of a method and system of the present invention may vary, the scope of the present invention is limited only by the claims that are appended hereto.

DETAILED DESCRIPTION OF THE PRESENT INVENTION

Figure 1:
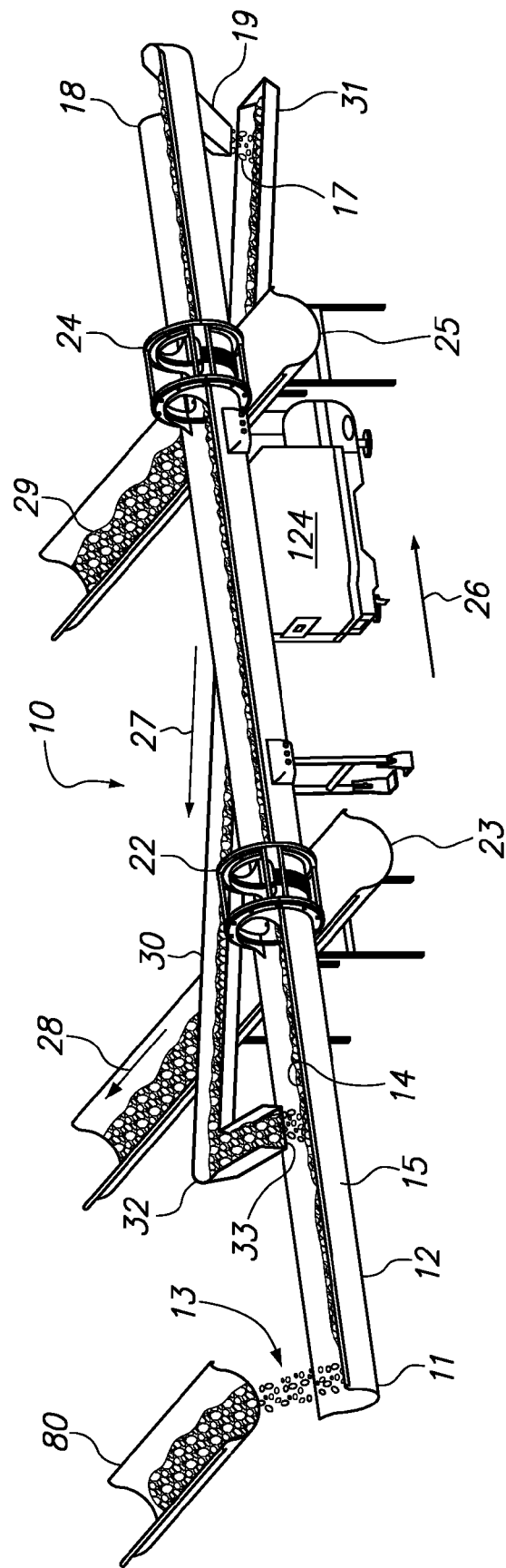
FIG. 1 is a perspective view of a conveyor system having a distribution conveyor, with a plurality of adjustable side-discharging flow control valves disposed within the distribution conveyor, and a recirculation conveyor for receiving a tail stream from the distribution conveyor and recirculating the tail stream to a redeposit section.

The conveyor method and conveyor system of the present invention provides a "FIFO" or "first in—first out" approach to preserving product freshness. The conveyor method and conveyor apparatus of the present invention provides a way of ensuring that a tail stream of product arriving at the distal end of the distribution conveyor is, after being combined with an incoming source stream of the food product, at least a part of the first product stream to be discharged from the distribution conveyor for further processing, such as being seasoned and/or for weighing and bagging.

Unlike conventional conveyor systems with return-loop accumulation capacity, embodiments of the apparatus and systems of the present invention are not used in place of upstream accumulation and are not used to hold large quantities of product. In one application, an embodiment of the apparatus and system of the present invention can be used to receive and temporarily store, in motion, and then forward, the stream of product that is between an upstream accumulation system and a weighing and bagging machine that may be deactivated for a film change or other service or maintenance. Product in this portion of a plant is called "product in flight." As a control system monitors the amount of product needed to sustain operation of a weighing and bagging machine and adjusts an adjustable side-discharging flow control valve to release the required portion of the source stream to a receiving conveyor for transport to the weighing and bagging machine, excess product resulting from temporary deactivation and/or turndown of a weighing and packaging machine that is supplied by an adjustable side-discharging flow control valve in the distribution conveyor (i.e., product in flight) is discharged from the distribution conveyor as a tail stream and received onto the recirculation conveyor.

Embodiments of the apparatus and system of the present invention can be used to solve another problem commonly encountered with facility conveyor systems having adjustable side-discharging flow control valves. The problem occurs when there is an insufficient supply of a source stream of product remaining on the distribution conveyor at the last of one or more adjustable side-discharging flow control valves to fulfill the minimum throughput requirement of a seasoning station that is fed by that flow control valve. A conventional seasoning station has a minimum rate of product flow to be seasoned below which the seasoning station must be deactivated to prevent unwanted over-seasoning of the product. Upon detection of an insufficient product flow rate bound for a seasoning station, the adjustable side-discharging flow control valve that supplies the seasoning station is closed to prevent the unwanted over-seasoning. As a result, the product on the distribution conveyor passes through and beyond the last adjustable side-discharging flow control valve, which is closed, and that remaining portion of the source stream of product becomes a tail stream that is introduced onto the recirculation conveyor.

Embodiments of the apparatus and system of the present invention can be used to solve another problem that occurs in a facility when there is an excessive rate of the source stream of a food product that is being introduced onto the distribution conveyor—at a rate that exceeds the feed rate required by the seasoning stations and weighing and bagging machines that are supplied from that distribution conveyor. A seasoning station generally has a maximum rate of product flow that can be seasoned at the seasoning station. When the product flow rate exceeds the maximum flow rate, the seasoning station must be deactivated to prevent unwanted under-seasoning of the food product being delivered to the seasoning station. Upon detection of an excessive product flow rate, the adjustable side-discharging flow control valve that supplies that seasoning station can be closed or adjusted towards closure to stop or to reduce the amount of food product being discharged from the distribution conveyor through the adjustable side-discharging flow control valve to the seasoning station to prevent under-seasoning. As a result, a tail stream of product equal to the rate at which the food product enters the last of the adjustable side-discharging flow control valves in the distribution conveyor, less the amount of product discharged from the distribution conveyor to the seasoning station fed by the last of the adjustable side-discharging flow control valves, passes beyond the last adjustable side-discharging flow control valve to be included within a tail stream that is discharged at the distal end of the distribution conveyor to the recirculation conveyor. This remedial action prevents the need for starting and stopping the distribution conveyor.

Embodiments of the method of the present invention can be used to manage an inventory of a food product that is a raw feedstock to two or more separate seasoning stations and/or weighing and bagging machines at which the food product is seasoned and/or weighed and bagged. For example, but not my limitation, a stream of raw feedstock, a food product, may be divided into two or more separated streams so that two or more weighing and bagging machines that are adapted for producing sealed bags of differing weights may each receive a stream of food product to satisfy the demand rate at which the weighing and bagging machines will operate. As another example, again not by way of limitation, two or more weighing and bagging machines may be adapted for receiving separated streams of a food product that has been seasoned, in two or more seasoning stations, with different flavors of seasoning, and then for producing sealed bags of the seasoned food product in bags bearing information identifying the flavor(s) that have been applied to the raw food product streams to make those two or more particular flavors.

It is important that the raw feedstock food product be conveyed and separated and delivered to a seasoning station and/or a weighing and bagging machine in a manner that avoids prolonged exposure of the stream of food product to the environment, which may lead to staleness and loss of consumer satisfaction, and it is important to avoid unwanted waste due to the discarding of any of the conveyed food product that is excessively exposed to the environment. The system, apparatus and method of the present invention satisfies those objectives.

FIG. 1 is a perspective view of a conveyor system 10 that includes a distribution conveyor 12 to move a source stream 14 of perishable product in the direction of arrow 26, having a first side-discharging flow control valve 22 to feed a first receiving structure 23 such as, for example, a first receiving conveyor, and second side-discharging flow control valve 24 to feed a second receiving structure 25 such as, for example, a second receiving conveyor, and a recirculation conveyor 30. The distribution conveyor 12 includes a proximal end 11 and a distal end 18, and the distribution conveyor 12 receives a source stream 14 of a perishable food product 13 at the proximal end 11 from a source conveyor 80. The first side-discharging flow control valve 22 discharges a first portion 28 of the source stream 14 of the perishable product 13 from the distribution conveyor 12 to the first receiving structure 23, and the second side discharging flow control valve 24 discharges a second portion 29 of the source stream of product 13 to a second receiving conveyor 25.

The tail stream 17 is a portion of the source stream 13 that remains on the distribution conveyor 10 intermediate the second side-discharging flow control valve 24 and the distal end 18 after the first portion 28 of the source stream 13 is discharged from the distribution conveyor 12 to the first receiving structure 23 and after the second portion 29 of the source stream 13 is discharged from the distribution conveyor 12 to the second receiving structure 25. The tail stream 17 moves along the distribution conveyor 12 in the direction of arrow 26 to the distal end 18, which includes a down comer 19 to direct the tail stream 17 onto a proximal end 31 of the recirculation conveyor 30. The recirculation conveyor 30 then moves the tail stream 17 received from the distal end 18 of the distribution conveyor 12 upwardly relative to the distribution conveyor 12 and in the direction of arrow 27 to a redeposit section 15 of the distribution conveyor 12 that is intermediate the proximal end 11 of the distribution conveyor 12 and the first side-discharging flow control valve 22. The recirculation conveyor 30 terminates at a distal end 32 having a down comer 33 positioned to deposit the tail stream 17 within the redeposit section 15 of the distribution conveyor 12 that is laterally offset from a centerline 88 (not shown in FIG. 1—see FIG. 2) and intermediate the proximal end 11 of the distribution conveyor 12 and the first adjustable side-discharging flow control valve 22 from which the first portion 28 of the source stream 13 of the perishable food product is discharged to the first receiving conveyor 23.

Figure 2:
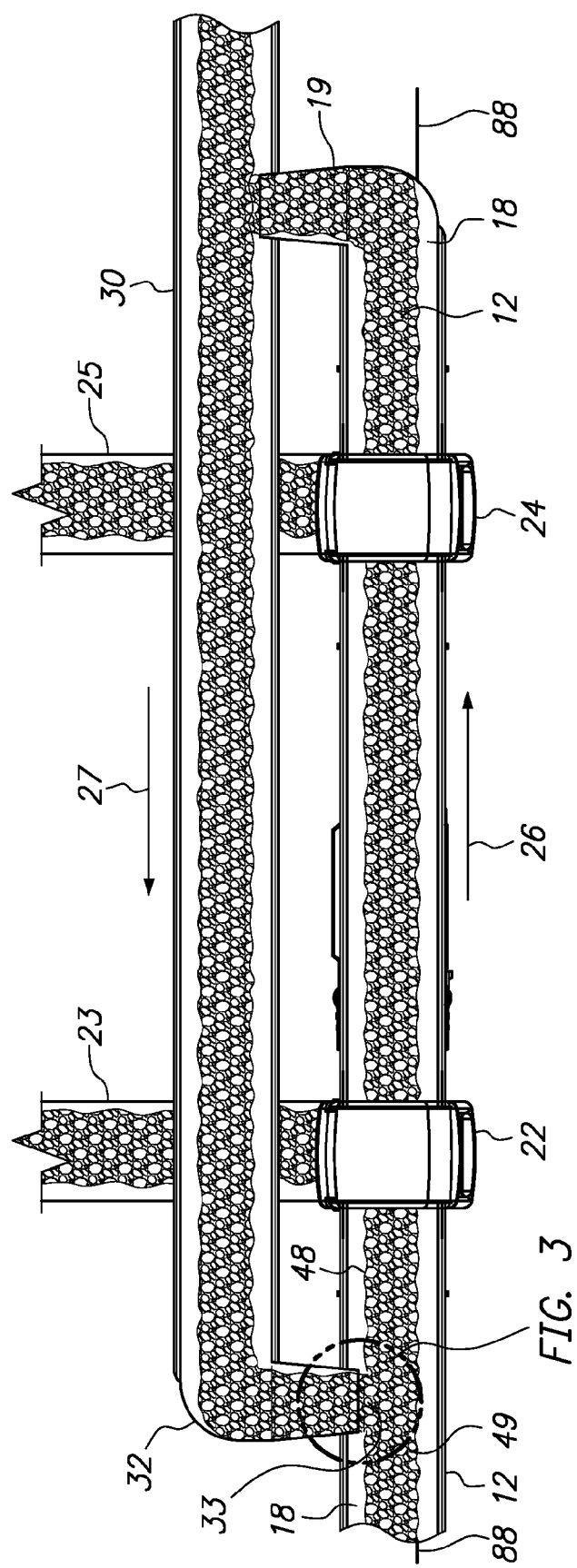
FIG. 2 is a plan view of a portion of the conveyor system of FIG. 1 that includes a portion of the distribution conveyor, a first adjustable side-discharging flow control valve, a second adjustable side-discharging flow control valve and a recirculation conveyor.

FIG. 2 is a plan view of a portion of the system of FIG. 2 that better shows the changes in the size of the source stream 13 of the perishable food product as it moves away from the source conveyor 80 (not shown in FIG. 2), through the first adjustable side-discharging flow control valve 22 and the second adjustable side-discharging flow control valve 24, to the distal end 18 and to the recirculation conveyor 30 that deposits the tail stream 17 at a position that is laterally offset from the centerline 88 of the distribution conveyor 12 and within a redeposit section 15 of the distribution conveyor 12.

Figure 3:
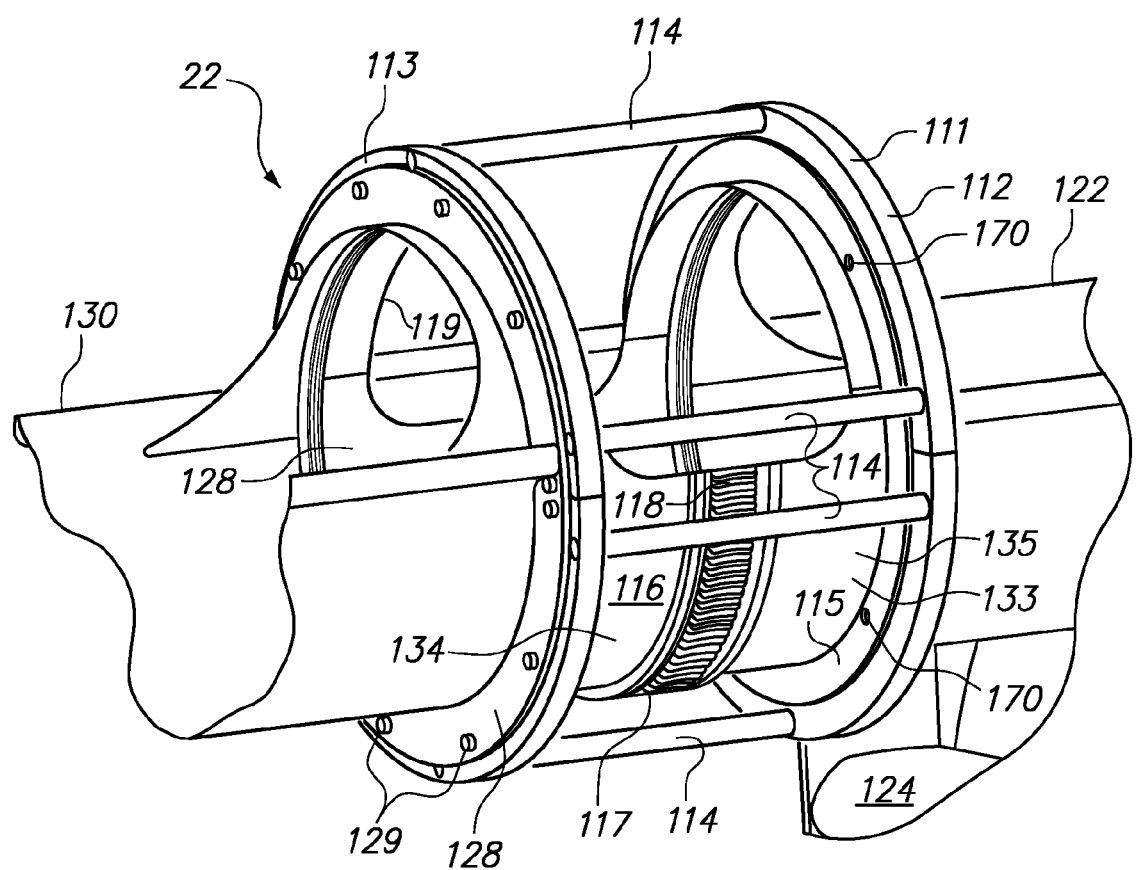
FIG. 3 is an enlarged view of one type of flow control valve, an adjustable side-discharging flow control valve, of FIG. 2 with a rotatable sleeve drive motor removed to reveal details of the adjustable side-discharging flow control valve.

FIG. 3 is an enlarged view of the adjustable side-discharging flow control valve 22 of the distribution conveyor 12 of FIG. 2 with the drive motor removed from the adjustable flow control valve 22 to better reveal structural details of the adjustable flow control valve 22. The adjustable side-discharging flow control valve 22 of FIG. 3 comprises a cage 111 having a first end flange 112, a second end flange 113 and a plurality of circumferentially-spaced braces 114 connected therebetween. A conveyor portion 130, which is a component of the distribution conveyor 12, is connected at a flange coupling 115 to the second end flange 113 of the adjustable side-discharging flow control valve 22. The tray 122 is similarly connected at a flange coupling 115 to the first end flange 112.

The braces 114 of the adjustable side-discharging flow control valve 22 are connected between the first end flange 112 and the second end flange 113 of the cage 111. The braces 114 are together sufficiently robust to transfer large and cyclically-reversing loads imparted to the tray 122 coupled to the first end flange 112 of the cage 111, to the cage 111 itself, and to the conveyor portion 130 coupled to the second end flange 113 of the cage 111. More specifically, the braces 114 transfer loads imparted by the differential impulse driver 124, to the tray 122 through the first end flange 112 of the cage 111, through the braces 114, and to the second end flange 113 of the cage 111 to the conveyor portion 130. It will be understood that the load transferred by the braces 114 of the cage 111 of the adjustable side-discharging flow control valve 22 may generally include a cyclic compression-alternating-tension load directed generally along the braces 114 as a result of the reciprocation of the distribution conveyor 12 using the differential impulse driver 124. The loading may further include a cycling bending moment attributable to the centroid of the weight of the conveyor portions, for example, conveyor portion 130 and tray 122, located to the left and to the right of the adjustable side-discharging flow control valve 22, respectively, being below a center axis through the first end flange 112 and second end flange 113.

FIG. 3 illustrates a rotatable sleeve 116 movably received within the cage 111. The rotatable sleeve 116 of FIG. 3 is slidably coupled at first end 133 of the rotatable sleeve 116 to the first end flange 112 of the cage 111 and at a second end 134 of the rotatable sleeve 116 to the second end flange 113 of the cage 111. A gear 117, having a plurality of gear teeth 118, is wrapped along a curved outer surface 135 of the rotatable sleeve 116. The rotatable sleeve 116 comprises an opening 119. The rotatable sleeve 116 is rotatable about a center axis (not shown) using a motor (not shown in FIG. 3—see FIG. 4) to position the opening 119 between an elevated position, illustrated in FIG. 3, and a lowered position illustrated in FIG. 4. In one embodiment of the adjustable side-discharging flow control valve 22, the motor (not shown in FIG. 3) is reversible. The gear 117 extends only about a portion of the curved outer surface 135 of the rotatable sleeve 116 so as to leave the opening 119 unobstructed. It will be understood that the gear 117 may be described as a segment of a spur gear.

FIG. 3 reveals a tray flange 128 connected to the second end flange 113 of the cage 111 of the adjustable side-discharging flow control valve 24 using conventional fasteners 129. The tray flange 128 couples the conveyor portion 130 to the left of the adjustable side-discharging flow control valve 22 in FIG. 3 to the cage 111 of the adjustable side-discharging flow control valve 22. It will be understood that a similar tray flange 128 is disposed on the right side of the adjustable side-discharging flow control valve 22 in FIG. 3 to couple the tray 122 to the first end flange 112 of the cage 111 of the adjustable side-discharging flow control valve 111. FIG. 3 further reveals the rightmost positioning ring 115 of the rotatable sleeve 116 of the adjustable side-discharging flow control valve 22. The leftmost positioning ring 115 of the rotatable sleeve 116 of the adjustable flange 24 is hidden from view in FIG. 3. Each positioning ring 115 rotates within the cage 111 of the adjustable side-discharging flow control valve 22 along with the rotatable sleeve 116. The positioning ring 115 visible in FIG. 3 includes threaded apertures 170. These threaded apertures 170 are used to couple spring-biased plunger assemblies 171 (not shown in FIG. 3—see FIGS. 8 and 9) to the positioning rings 115 on the rotatable sleeve 116 of an adjustable side-discharging flow control valve 22, as will be discussed in more detail in connection with FIGS. 8 and 9.

Figure 4:
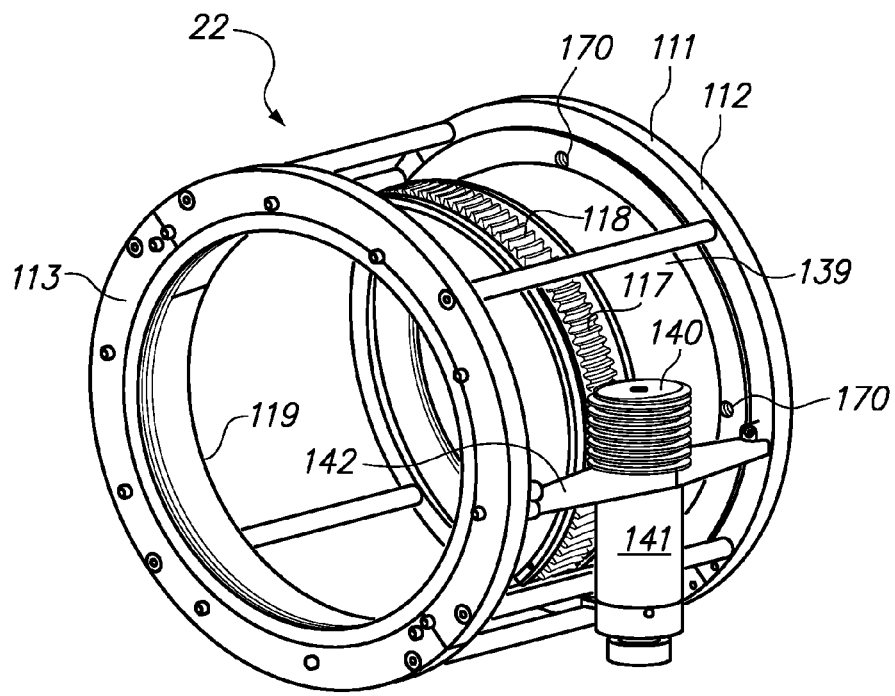
FIG. 4 is a perspective view of the embodiment of the leftmost adjustable side-discharging flow control valve of FIG. 2 with the drive motor coupled to the adjustable side-discharging flow control valve to controllably rotate the rotatable sleeve.

FIG. 4 is a perspective view of the embodiment of the adjustable side-discharging flow control valve 22 of FIG. 3 decoupled from the conveyor portion 130 and the tray 122 and with a motor 141 and a drive gear 140 operably coupled to controllably position the rotatable sleeve 116 within the cage 111 of the adjustable side-discharging flow control valve 22. The motor 141 is coupled to a motor support 142 that is, in turn, coupled intermediate the first end flange 112 and the second end flange 113 of the cage 111 of the adjustable side-discharging flow control valve 22. The drive gear 140, which is a worm gear, is rotatable by the motor 141 to slidably engage teeth 118 of the gear 117 and to move the gear 117 on the rotatable sleeve 116 either upwardly along the drive gear 140 or downwardly along the drive gear 140, depending on the direction of rotation of the drive gear 140 by the motor 141.

The adjustable side-discharging flow control valves 22 and 24 illustrated in FIGS. 2 and 3 show the rotatable sleeve 116 with the opening 119 in an elevated position so that all food product entering the adjustable side-discharging flow control valve 22 will pass through the rotatable sleeve 116 regardless of the direction of movement of the food product along the conveyor run 120. FIG. 4 shows the rotatable sleeve 116 with the opening 119 lowered by operation of the motor 141 so that product entering the adjustable side-discharging flow control valve 22 will drop through the lowered opening 119 and from the adjustable side-discharging flow control valve 22 to a directly receiving conveyor so that no food product passes through the adjustable side-discharging flow control valve 22. It will be understood that the motor 141 of FIG. 4 can be controllably operated to position the opening 119 of the rotatable sleeve 116 of the adjustable side-discharging flow control valve 22 between these two extreme positions illustrated in FIG. 3 (elevated) and FIG. 4 (lowered) so that some of the products are dropped from the adjustable side-discharging flow control valve 22 and some of the products pass through the adjustable side-discharging flow control valve 22.

Figure 5:
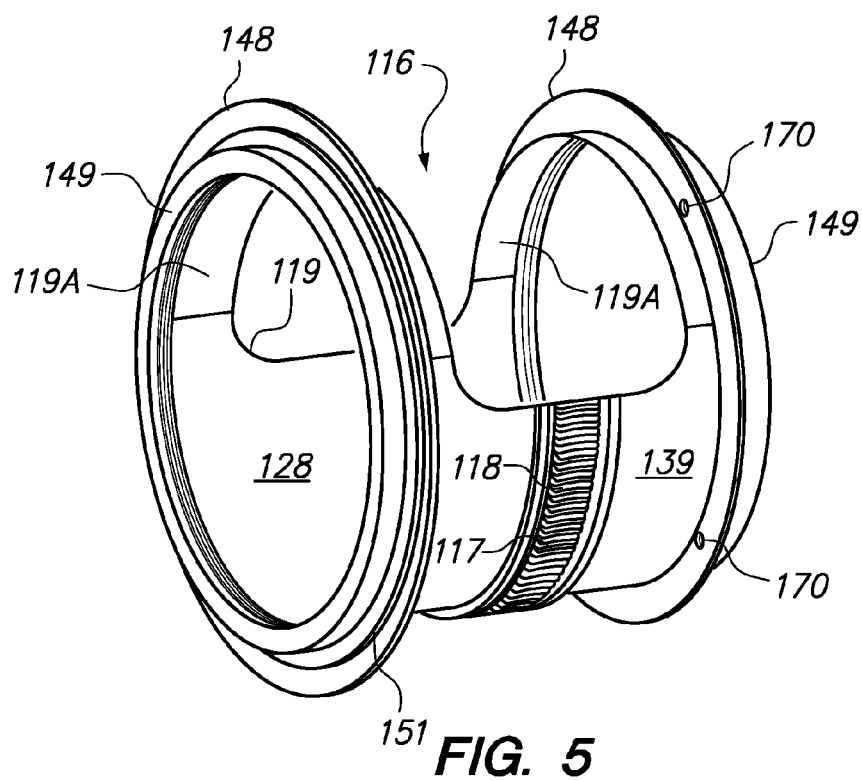
FIG. 5 is a perspective view of the rotatable sleeve of the adjustable side-discharging flow control valve of FIG. 4.

FIG. 5 is a perspective view of the rotatable sleeve 116 of the adjustable side-discharging flow control valve 22 of FIG. 4 disposed intermediate a pair of wear shoes 149. Each wear shoe 149 has a flange 151 that engages the positioning ring 148 of the rotatable sleeve 116. The wear shoes 149 reside within the cage 111 of the adjustable side-discharging flow control valve 22 along with the rotatable sleeve 116 to engage and position the positioning rings 148 of the rotatable sleeve 116 as it cyclically accelerates and decelerates within the cage 111 (not shown in FIG. 5—see FIG. 4). The wear shoes 149 cooperate with plunger assemblies 171, which are discussed in more detail in connection with FIGS. 8 and 9. FIG. 5 reveals the structures that seal with, position and movably couple the rotatable sleeve 116 within the cage 111. FIG. 5 reveals the positioning rings 148 extending radially outwardly from the rotatable sleeve 116, each positioning ring 148 having threaded apertures 170 for coupling spring-biased plunger assemblies 171. In the assembled state illustrated in FIG. 4, the rightmost positioning ring 148 (not shown in FIG. 4—see FIG. 5) of the rotatable sleeve 116 is received into a corresponding interior groove (not shown) within a bore of the first end flange 112 (not shown in FIG. 5—see FIG. 4) of the cage 111 and the leftmost positioning ring 148 (not shown in FIG. 4—see FIG. 5) is received into a corresponding interior groove (not shown) within a bore of the second end flange 113 (not shown in FIG. 5—see FIG. 4) of the cage 111. As can be seen in FIG. 4, the first end flange 112 and the second end flange 113 are each constructed by combining two semi-circular halves and coupling the halves together to form the fully circular first and second end flanges 112 and 113. This arrangement is akin to a clamshell structure that receives the positioning rings 148 within interior grooves within the end flanges 112 and 113 of the cage 111. The positioning rings 148 of the rotatable sleeve 116 illustrated in FIG. 5 radially engage and slide within the corresponding interior grooves of the cage 111, and axially engage and rotate against the wear shoes 149 captured within the cage 111 along with the rotatable sleeve 116. The wear shoes 149 and the cage 111 cooperate to maintain the rotatable sleeve 116 in a desired position within the cage 111 while allowing the opening 119 to be selectively positioned by operation of the motor 141.

It will be understood that the cyclic acceleration and deceleration imparted to the adjustable side-discharging flow control valve 22 through the tray 122 would impart a recurring slapping or lashing effect to the rotatable sleeve 116 disposed within the cage 111 of the adjustable side-discharging flow control valve 10 without mechanical features provided to minimize the damage resulting from such rigorous motion. The wear shoes 149 function as very (axially) short journal bearings that intermittently engage and bear against the rotatable sleeve 116 within the bores of the first end flange 112 and the second end flange 113 of the cage 111. When the motor 141 is operated, the rotatable sleeve 116 is rotated within the cage 111 of the adjustable side-discharging flow control valve 22 to elevate or to lower the opening 119. If the opening 119 is positioned as illustrated in FIG. 4, food product moving from, for example, the tray 122 into the rotatable sleeve 116 of the adjustable side-discharging flow control valve 22 will fall through the opening 119 to a receiving conveyor 72 as shown in FIG. 1. When the rotatable sleeve 116 is rotated within the cage 111 of the adjustable side-discharging flow control valve 22 to elevate the opening 119, as illustrated in FIGS. 2, 3 and 5, product entering the adjustable side-discharging flow control valve 22 will pass through the rotatable sleeve 116 and through the wear shoes 149 that straddle the rotatable sleeve 116. The adjustable side-discharging flow control valve 22 opening 119 may be positioned at a number of positions intermediate the lowered and elevated positions illustrated in FIGS. 4 and 3, respectively, so that a controllably selectable portion of the stream of product that enters the adjustable side-discharging flow control valve 22 will pass through the rotatable sleeve 116 of the adjustable side-discharging flow control valve 22 and remain on the distribution conveyor 12 while the remainder of the stream of product will fall through the opening 119 of the adjustable side-discharging flow control valve 22 and be dropped from the distribution conveyor 12 that includes the adjustable side-discharging flow control valve 22.

The adjustable side-discharging flow control valve 22 includes structures to isolate the surfaces of the rotatable sleeve 116 on which food product are supported and moved and to prevent unwanted materials from escaping the product-supporting surfaces or from fouling the interfaces between moving and non-moving components of the adjustable side-discharging flow control valve 22.

Figure 6:
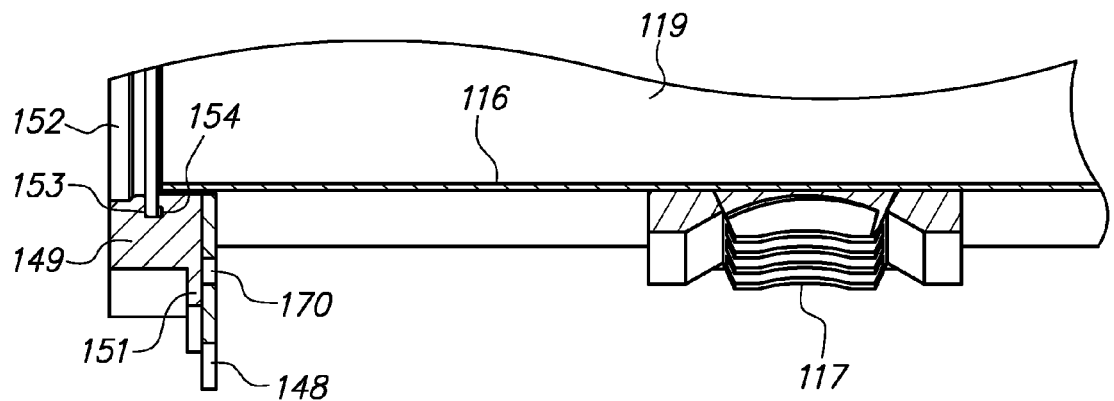
FIG. 6 is a partial cross-sectional view of a portion of the adjustable side-discharging flow control valve and a wear shoe.

FIG. 6 is an enlarged partial cross-sectional view of a portion of the adjustable side-discharging flow control valve 22. The position of the rotatable sleeve 116 in FIG. 6 corresponds to the opening 119 being in the elevated position as illustrated in FIG. 5 and reveals the sealing structures between the rotatable sleeve 116 and the wear shoe 149 disposed adjacent thereto. FIG. 6 also shows the gear 117 of the rotatable sleeve 116 and the leftmost positioning ring 148 of the rotatable sleeve 116 disposed adjacent to the wear shoe 149. The wear shoe 149 includes a seal groove 154 into which a seal extension 153 is received.

Figure 7:
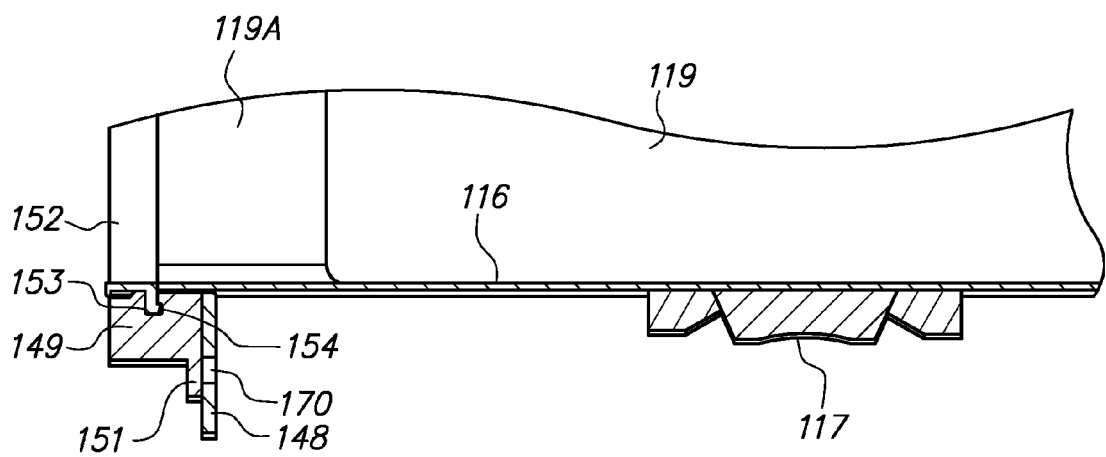
FIG. 7 is a partial cross-sectional view of a portion of the adjustable side-discharging flow control valve showing the relationship of the rotatable sleeve, an adjacent wear shoe and a seal.

FIG. 7 is an enlarged partial cross-sectional view of a portion of an embodiment of the adjustable side-discharging flow control valve 22. The position of the rotatable sleeve 116 in FIG. 7 corresponds to the opening 119 being in the lowered position as illustrated in FIG. 4 and reveals the sealing structures between the rotatable sleeve 116 and the wear shoe 149. The rotatable sleeve 116 includes the opening 119 and the adjacent opening periphery 119A (also shown in FIG. 5). FIG. 7 also shows the gear 117 of the rotatable sleeve 116 and the leftmost positioning ring 148 of the rotatable sleeve 116 disposed adjacent to the wear shoe 149. The wear shoe 149 includes a radially-outwardly extending portion 151 to increase the area of engagement between the wear shoe 149 and the positioning ring 148. The threaded aperture 170 in the positioning ring 148 of the rotatable sleeve 116 is shown in FIG. 6. This threaded aperture 170 is discussed in more detail below and in connection with FIG. 9.

Wear shoes 149 bear the axial loading of the rotatable sleeve 116 of the adjustable side-discharging flow control valve 22 that results from the adjustable side-discharging flow control valve 22 being cyclically moved back and forth by the differential impulse driver 124 shown in FIG. 1. It will be understood that cyclical forces imparted by the differential impulse driver 124 through a conveyor portion proximal to the adjustable side-discharging flow control valve 22 are transferred to the rotatable sleeve 116 and to the abutting wear shoes 149 through spring-biased plunger assemblies 171 (see FIG. 8).

Figure 8:
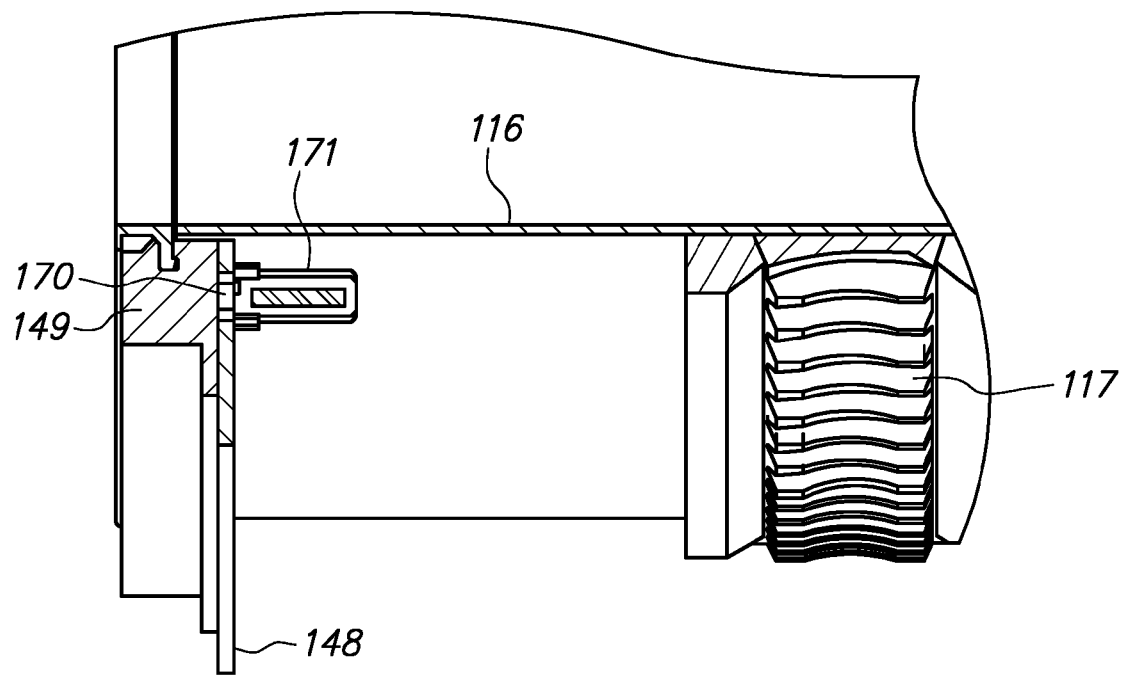
FIG. 8 is an enlarged partial cross-sectional view of a portion of an embodiment of the adjustable side-discharging flow control valve after a plunger assembly is coupled to the rotatable sleeve.

FIG. 8 is an enlarged partial cross-sectional view of a portion of an embodiment of the adjustable side-discharging flow control valve 22 after a plunger assembly 171 is coupled to the rotatable sleeve 116. The plunger assembly 171 is coupled to the rotatable sleeve 116 intermediate the rotatable sleeve 116 and the wear shoe 149 disposed adjacent to the positioning ring 148 of the rotatable sleeve 116. In one embodiment of the adjustable side-discharging flow control valve 10 of the present invention, a plunger assembly 171 is coupled to the positioning ring 148 at the left side of the adjustable side-discharging flow control valve 24 and another spring-biased plunger assembly 171 is coupled to the opposite, right side of the adjustable side-discharging flow control valve 10 to provide controlled movement of the rotatable sleeve 116 of the adjustable side-discharging flow control valve 10 relative to the straddling wear shoes 149 on either side of the rotatable sleeve 116.

Figure 9:
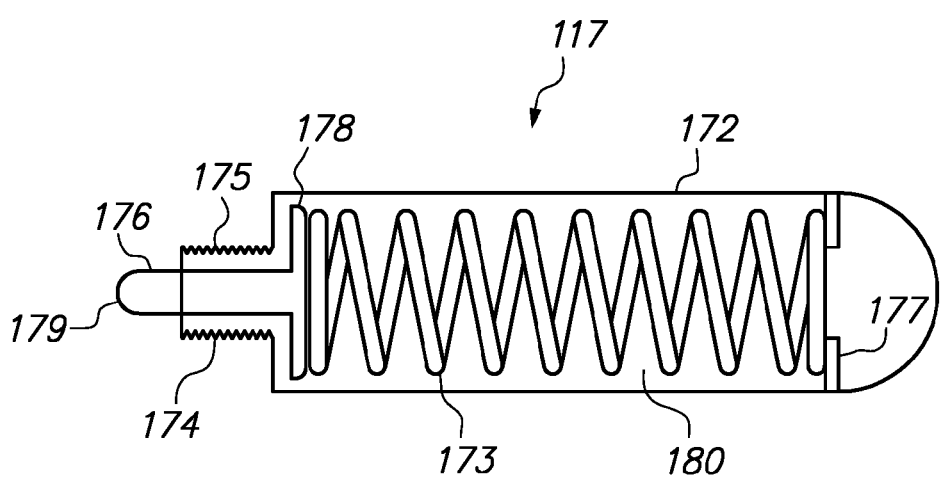
FIG. 9 is an enlarged and sectional view of the spring-biased plunger assembly of FIG. 8 removed from the rotatable sleeve for clarity.

FIG. 9 is an enlarged and sectional view of the spring-biased plunger assembly 171 of FIG. 8 removed from the rotatable sleeve 116 for clarity. The plunger assembly 171 comprises a body 172 having an interior chamber 180 to receive a coil spring 173 therein. The coil spring 173 is captured in a slightly compressed configuration intermediate the stop 177 near the end of the chamber 180 and a plunger tip 176. The body 172 includes a connector 174 having a diameter and threads 175 that correspond to the diameter and threads within the threaded aperture 170 in the positioning rings 148 (see FIGS. 3-5, 6 and 7). The plunger tip 176 includes a base 178 that engages the coil spring 173 and a wear-resistant nose 179 that engages the wear shoe 149 as shown in FIG. 8.

It will be understood that the rotation of the rotatable sleeve 116 within the cage 111 requires at least some clearance between the rotatable sleeve 116 and the straddling wear shoes 149. The amount of clearance may be, for example, 20 to 30 thousands of an inch. The clearance between the surface of the wear shoe 149 and the adjacent positioning ring 148 of the rotatable sleeve 116, along with the thickness of the positioning ring 148 and the mass of the rotatable sleeve 116, are among the factors that can be considered in the design of the plunger assembly 171. It will be further understood that, as the plunger assembly 171 is threadably installed into the threaded apertures 170 of the positioning rings 148 of the rotatable sleeve 116, the coil spring 173 will begin to be compressed at the time that the nose 179 of the plunger tip 176 engages the wear shoe 149 and, as the plunger assembly 171 is threaded into the aperture 170, the coil spring 173 will be loaded. The plunger assemblies 171 will maintain the position of the rotatable sleeve 116 between the straddling wear shoes 149 and will store and return kinetic energy imparted to the rotatable sleeve 116 by operation of the differential impulse driver 124. The plunger assemblies 171 will protect the rotatable sleeve 116 against the damaging effects of recurring cyclic slap that would otherwise damage the rotatable sleeve 116.

As explained above, individual food portions of the source stream 13 of food product that has been moved through, and not discharged from, the one or more adjustable side-discharging flow control valves 22 and 24 to become a part of the tail stream 17, and that has then been recirculated by the recirculation conveyor 30 to the redeposit section 15 of the distribution conveyor 12, is returned to the distribution conveyor 12 at a position that is laterally offset to a centerline 88 of the distribution conveyor 12 and is disposed in the distribution conveyor 12 along with the source stream 13 in a manner so that the individual food portions of the recirculated tail stream 17 will be preferentially discharged from the distribution conveyor 12 at the adjustable side-discharging flow control valves 22 and 24. Tests run by the applicant have determined that, with the first of the adjustable side-discharging flow control valves 22 and 24 only 20% open, then 97% of the recirculated tail stream 17 is discharged to a receiving structure 23 fed by the first of the one or more adjustable side-discharging flow control valves 22 and 24 within a conveyor system 10 of the present invention. In a conveyor system 10 having two or more adjustable side-discharging flow control valves 22 add 24, the mere 3% of the recirculated tail stream 17 is easily discharged from the distribution conveyor 12 at the second adjustable side-discharging flow control valve 22 for a tail stream 17 discharge factor of 100%. This means that not even one of the large plurality of individual food portions that were a part of the recirculated tail stream 17 becomes a part of the tail stream 17 twice, thereby securely limiting the maximum exposure time of the stream of product 13 and ensuring freshness and consumer satisfaction with the weighted, bagged and sealed product.

Figure 10:
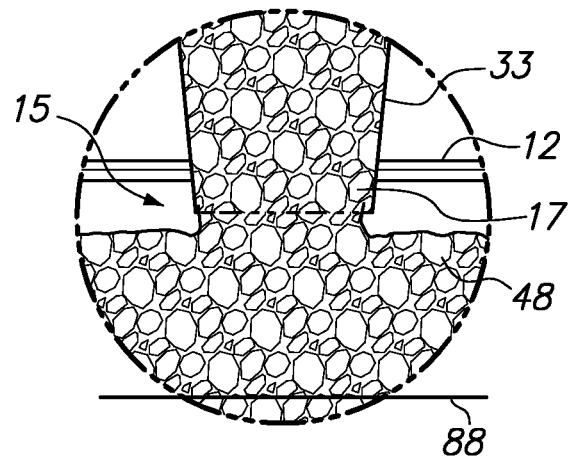
FIG. 10 is an enlarged plan view of the down comer at which the recirculation conveyor discharges the tail stream at a position that is laterally offset from a centerline of the distribution conveyor.

FIG. 10 is an enlarged plan view of the tail stream 17 as it is discharged from the down comer 33 of the recirculation conveyor 30 (not shown) into the distribution conveyor 12 at a position that is laterally offset from the centerline 88 of the distribution conveyor 12 and within the redeposit section 15 of the distribution conveyor 12.

Figure 11:
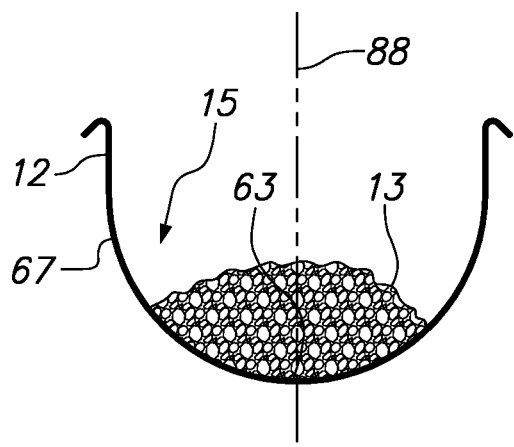
FIG. 11 is a sectioned elevation view of a semi-circular or "U"-shaped cross section of a conveyor section moving a stream of individual food portions.

FIG. 11 is a sectioned elevation view of a semi-circular or "U"-shaped cross section of a trough 63 of a distribution conveyor 12 moving a source stream 13 of individual food portions. The "U"-shaped cross section of the trough 63 is bisected by the centerline 88 of the distribution conveyor 12. The redeposit section 65 is disposed laterally offset to the centerline 88 of the distribution conveyor 12.

Figure 12:
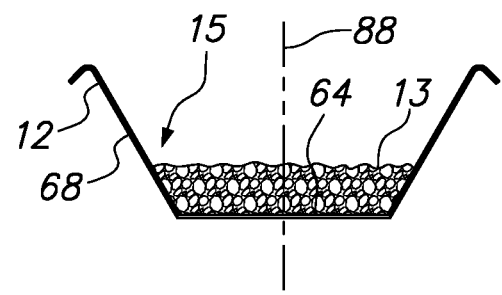
FIG. 12 is a sectioned elevation view of an inverted trapezoid-shaped cross section of a distribution conveyor section moving a stream of individual food portions.

FIG. 12 is a sectioned elevation view of a flat-bottomed inverted trapezoidally-shaped cross section of a trough 64 of a distribution conveyor 12 moving a source stream 13 of individual food portions. The flat-bottomed inverted trapezoidally-shaped cross section of the trough 64 is bisected by the centerline 88 of the distribution conveyor 12. The redeposit section 64 is disposed laterally offset to the centerline 88 of the distribution conveyor 12.

Figure 13:
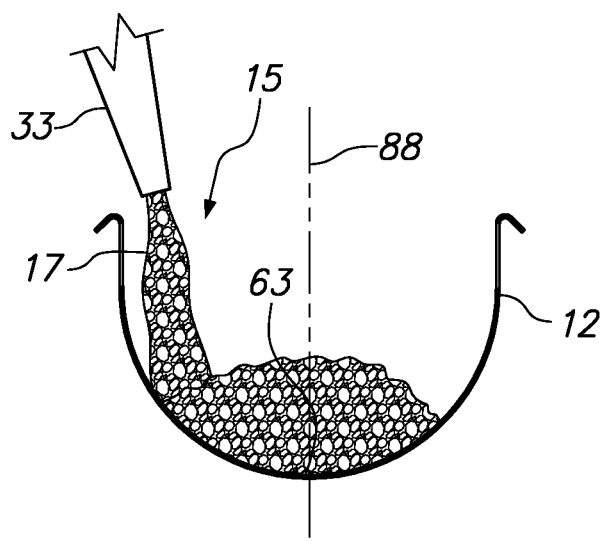
FIG. 13 is sectional view of the distribution conveyor illustrating the manner in which the recirculation conveyor discharges a recirculated tail stream to a redeposit section of the distribution conveyor that is laterally offset from a centerline of the distribution conveyor having a trough with a cross-section illustrated in FIG. 11.

FIG. 13 is sectional view of the distribution conveyor 12 illustrating the manner in which the recirculation conveyor 30 discharges a recirculated tail stream 17 to a redeposit section 15 of the distribution conveyor 12 that is laterally offset from a centerline 88 of the distribution conveyor 12 having a trough 63 with a cross-section illustrated in FIG. 11. FIG. 13 illustrates the discharge from the down comer 33 of the recirculation conveyor 30 into the redeposit section 15 of the distribution conveyor 12.

Figure 14:
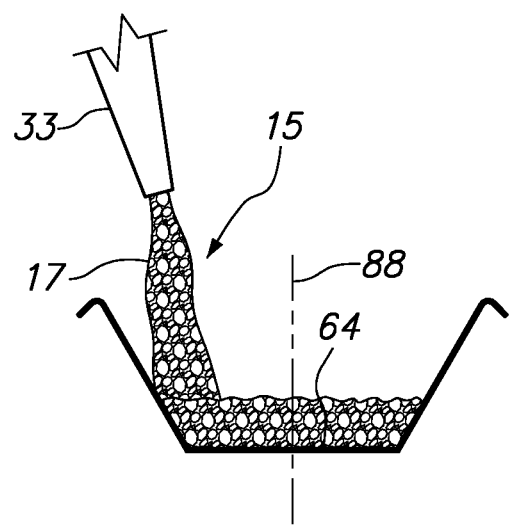
FIG. 14 is sectional view of the distribution conveyor illustrating the manner in which the recirculation conveyor discharges a recirculated tail stream to a redeposit section of the distribution conveyor that is laterally offset from a centerline of the distribution conveyor having a trough with a cross-section illustrated in FIG. 12.

FIG. 14 is sectional view of the distribution conveyor 12 illustrating the manner in which the recirculation conveyor 30 discharges a recirculated tail stream 17 to a redeposit section 15 of the distribution conveyor 12 that is laterally offset from a centerline 88 of the distribution conveyor 12 having a trough 63 with a cross-section illustrated in FIG. 12. FIG. 14 illustrates the discharge from the down comer 33 of the recirculation conveyor 30 into the redeposit section 15 of the distribution conveyor 12.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing an inventory of a large plurality of individual portions of a perishable food product, comprising:

providing an distribution conveyor having a first side, a second side, a centerline therebetween, a proximal end to receive a source stream of a perishable product, a distal end to discharge a tail stream of the perishable product from the distribution conveyor, and one or more adjustable side-discharging flow control valves intermediate the proximal end and the distal end of the distribution conveyor, each of the one or more adjustable side-discharging flow control valves being adjustable to discharge, from the first side of the distribution conveyor, a controllable portion of the source stream of product to a corresponding receiving structure that is disposed below each of the one or more adjustable side-discharging flow control valves;

providing a recirculation conveyor having a proximal end, disposed proximal to the distal end of the distribution conveyor to receive the tail stream that is discharged from the distal end of the distribution conveyor, and a distal end positioned to discharge the tail stream of product from the recirculation conveyor onto a redeposit section of the distribution conveyor, the redeposit section of the distribution conveyor being intermediate the proximal end of the distribution conveyor and a nearest of the one or more adjustable side-discharging flow control valves and laterally offset from the centerline of the redistribution conveyor towards the first side of the distribution conveyor;

activating the distribution conveyor to move at least a portion of the source stream of the perishable product that is received at the proximal end of the distribution conveyor through the one or more adjustable side-discharging flow control valves and to the distal end of the distribution conveyor for discharge to the proximal end of the recirculation conveyor;

activating the recirculation conveyor to move the tail stream received at the proximal end of the recirculation conveyor to the distal end for discharge to the redeposit section of the distribution conveyor;

conveying the tail stream along the distribution conveyor to the one or more adjustable side-discharging flow control valves; and discharging the tail stream to the one or more receiving structures for being conveyed to a weighing and bagging machine.

2. The method of claim 1, wherein each of the one or more receiving structures comprises a receiving conveyor having a proximal end disposed underneath the corresponding one of the one or more adjustable side-discharging flow control valves.

3. The method of claim 2, further comprising:

receiving, onto the proximal end of one of the one or more receiving conveyors, one of the tail stream and a mixture of the tail stream and a portion of the source stream of the perishable food product received onto the distribution conveyor at the proximal end of the distribution conveyor; and conveying the one of the tail stream and a mixture of the tail stream and the portion of the source stream of the perishable food product discharged to the one or more receiving conveyors to at least one of a seasoning station and a weighing and bagging machine.

4. The method of claim 3, further comprising:

receiving, onto the proximal end of another of the one or more receiving conveyors, one of a mixture of the remaining portion of the tail stream and a portion of the source stream of the perishable food product and a portion of the source stream of the perishable food product discharged through another of the one or more adjustable side-discharging flow control valves and from the distribution conveyor;

conveying, using the another of the one or more receiving conveyors, the one of a mixture of the remaining portion of the tail stream and a portion of the source stream of the perishable food product and a portion of the source stream of the perishable food product discharged from the another one of the one or more adjustable side-discharging flow control valves to at least one of a seasoning station and a weighing and bagging machine.

5. The method of claim 1, wherein providing a recirculation conveyor comprises:

providing one of a reciprocating recirculation conveyor and a belted recirculation conveyor.

6. The method of claim 5, wherein the recirculation conveyor is a reciprocating recirculation conveyor having a proximal end and a distal end that is elevated relative to the proximal end;

wherein the recirculation conveyor elevates the tail stream as it conveys the tail stream from the proximal end of the recirculation conveyor to the distal end of the recirculation conveyor.

7. The method of claim 1, wherein a bottom portion of a trough of the recirculation conveyor is one of rounded and flat.

8. The method of claim 7, wherein the trough of the recirculation conveyor is rounded; and wherein the trough is semi-circular in shape.

9. The method of claim 1, wherein providing a distribution conveyor comprises:

providing one of a reciprocating distribution conveyor and a vibrating declined distribution conveyor.

10. The method of claim 9, wherein providing a distribution conveyor comprises providing a reciprocating distribution conveyor; and wherein activating the distribution conveyor comprises axially reciprocating the distribution conveyor using a differential impulse driver.

11. An apparatus for use in managing an inventory consisting of a large plurality of individual perishable food portions, comprising:

a distribution conveyor having a proximal end, a distal end, a first side, a second side, a centerline intermediate the first side and the second side and at least one adjustable side-discharging flow control valve, along which a source stream of the individual perishable food portions is conveyable from the proximal end to the at least one adjustable side-discharging flow control valve; and a recirculation conveyor having a proximal end, positioned to receive a tail stream of the individual perishable food portions discharged from the distal end of the distribution conveyor, a distal end positioned to discharge the tail stream of the individual perishable food portions from the recirculation conveyor onto a redeposit section of the distribution conveyor that is intermediate the centerline and the first side of the distribution conveyor and intermediate the proximal end and the at least one adjustable side-discharging flow control valve.

12. The apparatus of claim 11, wherein a trough of the distribution conveyor includes one of a semi-circular bottom and a flat bottom disposed between a pair of opposed interior and obtuse angles formed between the flat bottom and a pair of opposed and upwardly inclined sidewalls.

13. The apparatus of claim 11, wherein the at least one adjustable side-discharging flow control valve is disposed intermediate the proximal end and the distal end of the distribution conveyor; and wherein the at least one adjustable side-discharging flow control valve being adjustable to discharge, from the first side of the distribution conveyor, a controllable portion of the source stream of product to a corresponding receiving structure that is disposed below each of the one or more adjustable side-discharging flow control valves.

14. The apparatus of claim 11, wherein the recirculation conveyor comprises one of a vibrating conveyor, a belt conveyor and a reciprocating conveyor.

15. A method of conveying a tail stream consisting of a large plurality of a perishable food product, comprising:

providing a distribution conveyor having a proximal end, a distal end, one or more adjustable side-discharging flow control valves therebetween, a first side, a second side and a centerline therebetween;

providing a recirculation conveyor having a proximal end, proximal to the distal end of the distribution conveyor, and a distal end;

activating the distribution conveyor;

activating the recirculation conveyor;

receiving a source stream consisting of a large plurality of perishable individual food portions on the proximal end of the distribution conveyor and conveying the source stream along the distribution conveyor to the one or more adjustable flow control valves;

discharging one or more portions of the source stream from the distribution conveyor to a receiving structure disposed proximal to each of the one or more adjustable flow control valves;

discharging a tail stream remaining on the distribution conveyor from the distal end of the distribution conveyor to the proximal end of the recirculation conveyor;

conveying the tail stream to the distal end of the recirculation conveyor; and discharging the tail stream from the distal end of the recirculation conveyor to a redeposit section of the distribution conveyor intermediate the proximal end and the one or more adjustable side-discharging flow control valves and offset from the centerline of the distribution conveyor in the direction of the first side of the distribution conveyor.

16. The method of claim 15, further comprising:

adjusting the one or more adjustable side-discharging flow control valves to discharge a portion of the combined source stream and tail stream to the receiving structure that is proximal thereto.

17. The method of claim 16, wherein the receiving structure is a receiving conveyor.

18. The method of claim 17, further comprising:

conveying the discharged portion of the combined source stream and tail stream to at least one of a seasoning station and a weighing and bagging machine.

\* \* \* \* \*